US006993709B1

(12) United States Patent
Lynn et al.

(10) Patent No.: US 6,993,709 B1
(45) Date of Patent: Jan. 31, 2006

(54) SMART CORNER MOVE SNAPPING

(75) Inventors: Heath A. Lynn, Lynwood, WA (US); Nathaniel M. McCully, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 871 days.

(21) Appl. No.: 09/658,742

(22) Filed: Sep. 11, 2000

Related U.S. Application Data

(60) Provisional application No. 60/182,132, filed on Feb. 12, 2000.

(51) Int. Cl.
G06F 3/00 (2006.01)

(52) U.S. Cl. .................................................... 715/502

(58) Field of Classification Search ................ 715/502, 715/513, 517; 716/21; 345/582, 634, 620; 703/1

See application file for complete search history.

(56) References Cited

U.S. PATENT DOCUMENTS

| | | | |
|---|---|---|---|
| 5,018,083 A | | 5/1991 | Wantanabe et al. |
| 5,175,806 A | * | 12/1992 | Muskovitz et al. ......... 345/582 |
| 5,287,443 A | | 2/1994 | Mameda et al. |
| 5,329,464 A | * | 7/1994 | Sumic et al. .................. 703/1 |
| 5,444,836 A | * | 8/1995 | Hollingsworth et al. .... 345/634 |
| 5,500,931 A | | 3/1996 | Sonnenschein |
| 5,501,538 A | | 3/1996 | Sawada et al. |
| 5,548,700 A | | 8/1996 | Bagley et al. |
| 5,579,471 A | | 11/1996 | Barber et al. |
| 5,581,670 A | | 12/1996 | Bier et al. |
| 5,617,115 A | | 4/1997 | Itoh et al. |
| 5,803,629 A | | 9/1998 | Neville et al. |
| 5,805,167 A | | 9/1998 | Van Cruyningen |
| 6,088,520 A | * | 7/2000 | Taoka et al. .................. 716/21 |

(Continued)

FOREIGN PATENT DOCUMENTS

JP 61-282974 12/1986

(Continued)

OTHER PUBLICATIONS

Microsoft Corporation, "Microsoft Word: User's Guide", 1993-1994, Microsoft Press, Version 6.0, pp. 386-387, 389, 392-394.*

(Continued)

Primary Examiner—Stephen Hong
Assistant Examiner—Kyle R. Stork
(74) Attorney, Agent, or Firm—Fish & Richardson P.C.

(57) ABSTRACT

A method and apparatus of a layout editing system for arranging page structural elements in an electronic document. An electronic document having a grid provided with a plurality of first attraction points is displayed on a display device. A page structural element whose outline is demarcated by a frame on the electronic document is also displayed on the display device. The page structural element is provided with a plurality of attractive second attraction points to adjust its position in accordance with the plurality of first attraction points. Upon detecting that the cursor is positioned inside the frame of the page structural element and that the button of a pointing device linked to the cursor is pressed down, the page structural element is held and only the second attraction point nearest to the cursor is selected from among the plurality of second attraction points to be an attractive state. A probe point is set to keep the relative positional relationship of the second attraction point and the cursor at that time. When the pointing device is operated and the cursor is moved, the second attraction point that has been made attractive to the movement of the cursor is moved and attracted to the first attraction point nearest the probe point, and the page structural element is moved accordingly.

17 Claims, 10 Drawing Sheets

U.S. PATENT DOCUMENTS

| | | |
|---|---|---|
| 6,330,577 B1 | 12/2001 | Kim |
| 6,359,630 B1 * | 3/2002 | Morse et al. ............... 345/620 |
| 6,426,751 B1 | 7/2002 | Patel et al. |
| 6,504,544 B1 | 1/2003 | Hollingsworth et al. |
| 2001/0048764 A1 | 12/2001 | Betrisey et al. |

FOREIGN PATENT DOCUMENTS

| | | |
|---|---|---|
| JP | 2-213983 | 8/1990 |
| JP | 04-052871 | 2/1992 |
| JP | 06-20026 | 1/1994 |
| JP | 6-96174 | 4/1994 |
| JP | 07-182303 | 7/1995 |
| JP | 8-194832 | 7/1996 |
| JP | 08-314655 | 11/1996 |
| JP | 10-222499 | 8/1998 |
| JP | 11-102446 | 4/1999 |
| JP | 11-353491 | 12/1999 |
| JP | 2000-267645 | 9/2000 |
| JP | 2001-281835 | 10/2001 |
| JP | 2001-297077 | 10/2001 |
| JP | 2003-523015 | 7/2003 |

OTHER PUBLICATIONS

Microsoft Corporation. User's Guide: Microsoft Word. 1993-1994. Microsoft Corporation. Version 6.0. pp. 392-393.*

* cited by examiner

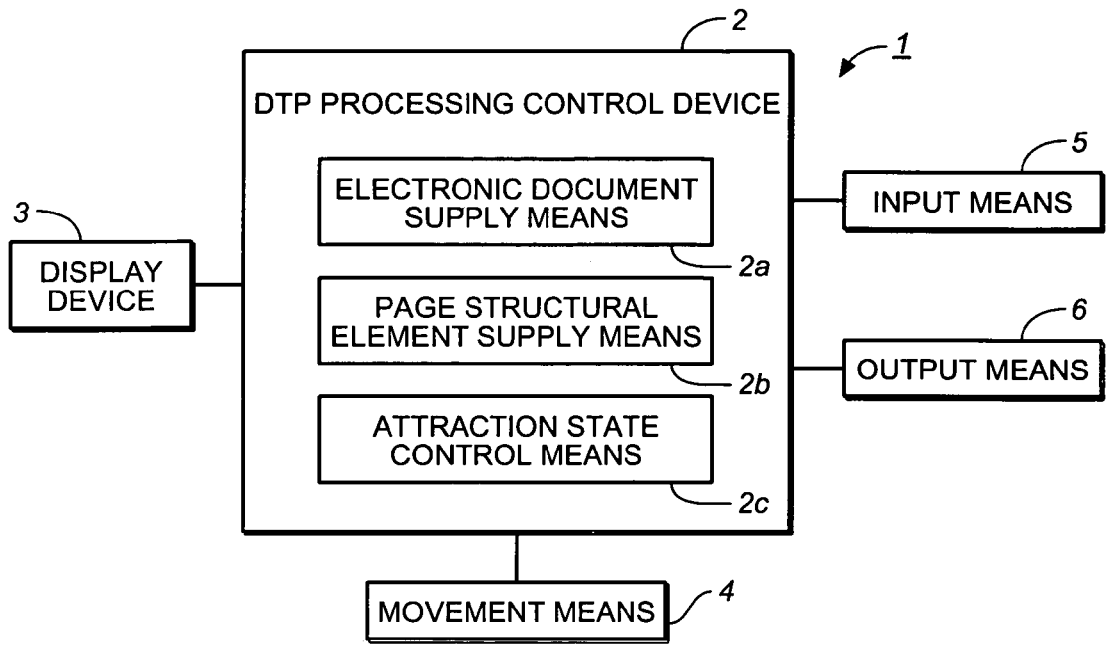
FIG._1
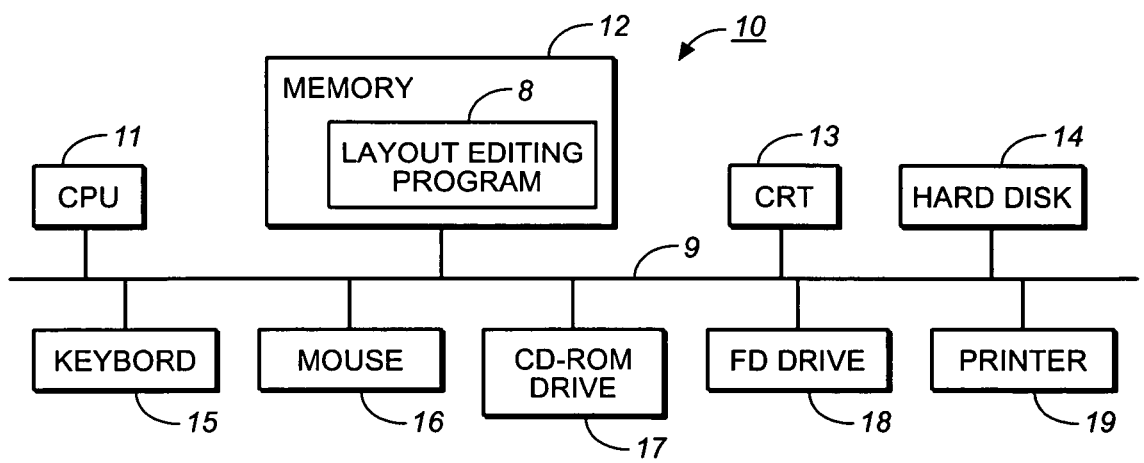
FIG._2

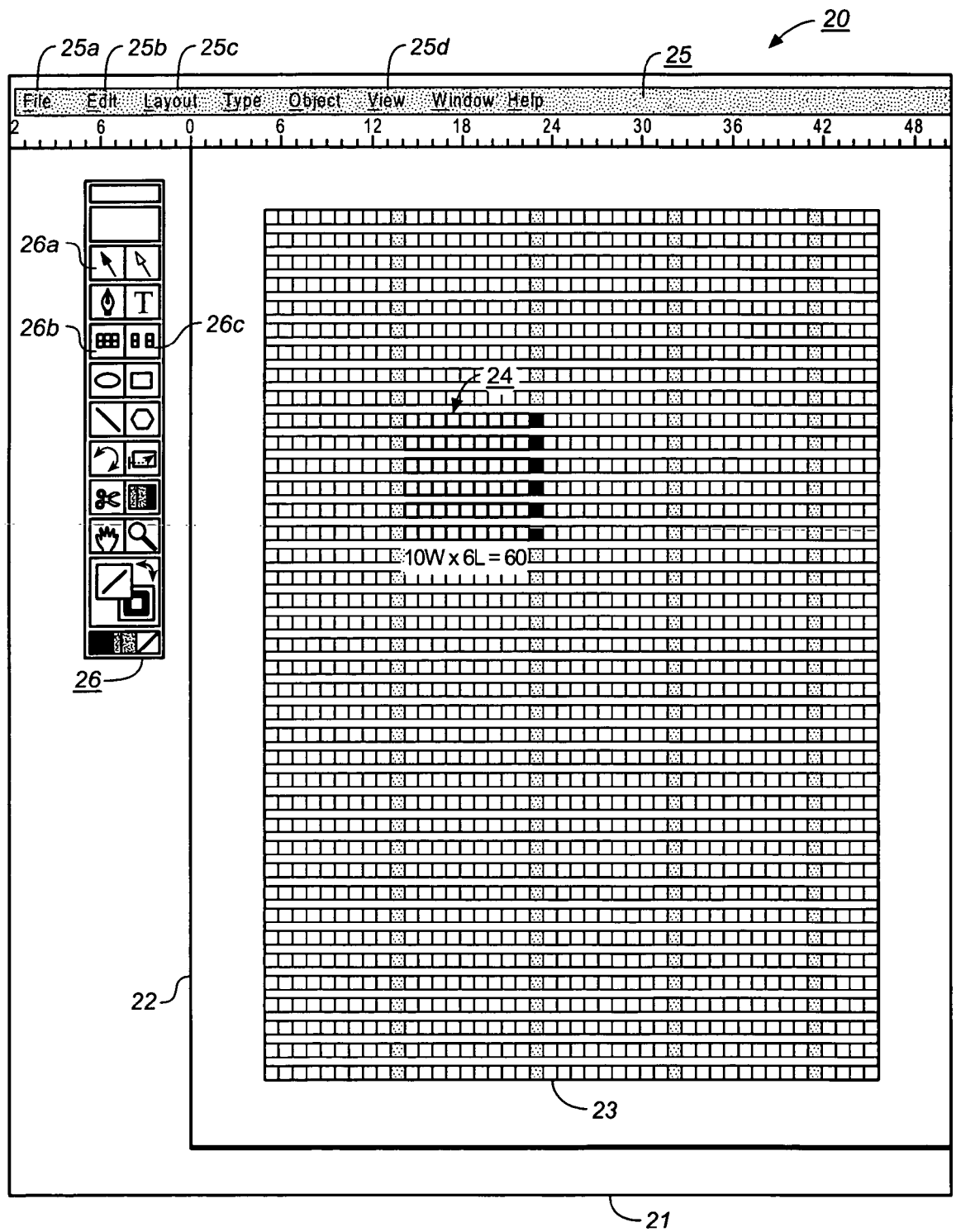
FIG._3

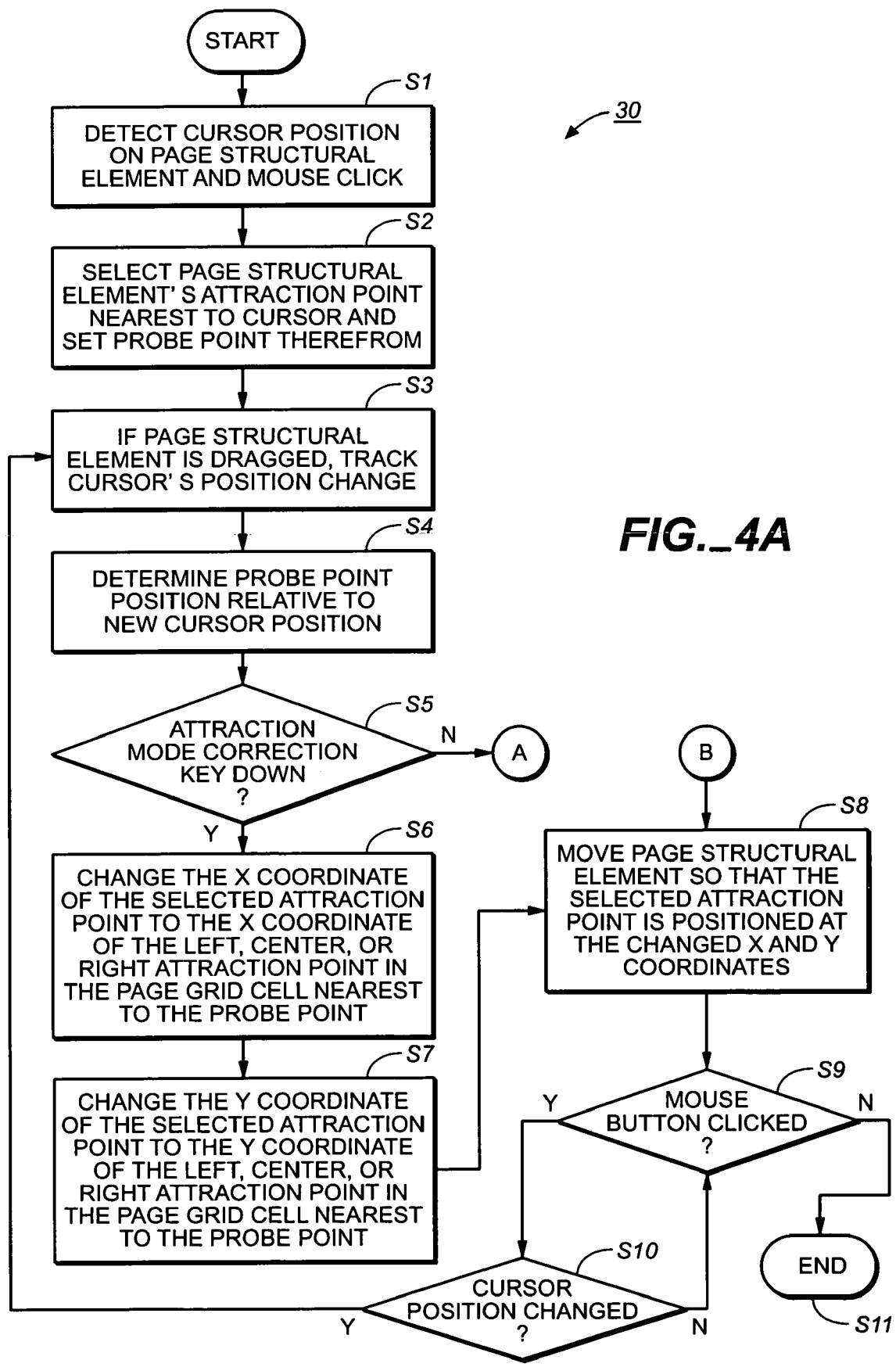
FIG._4A

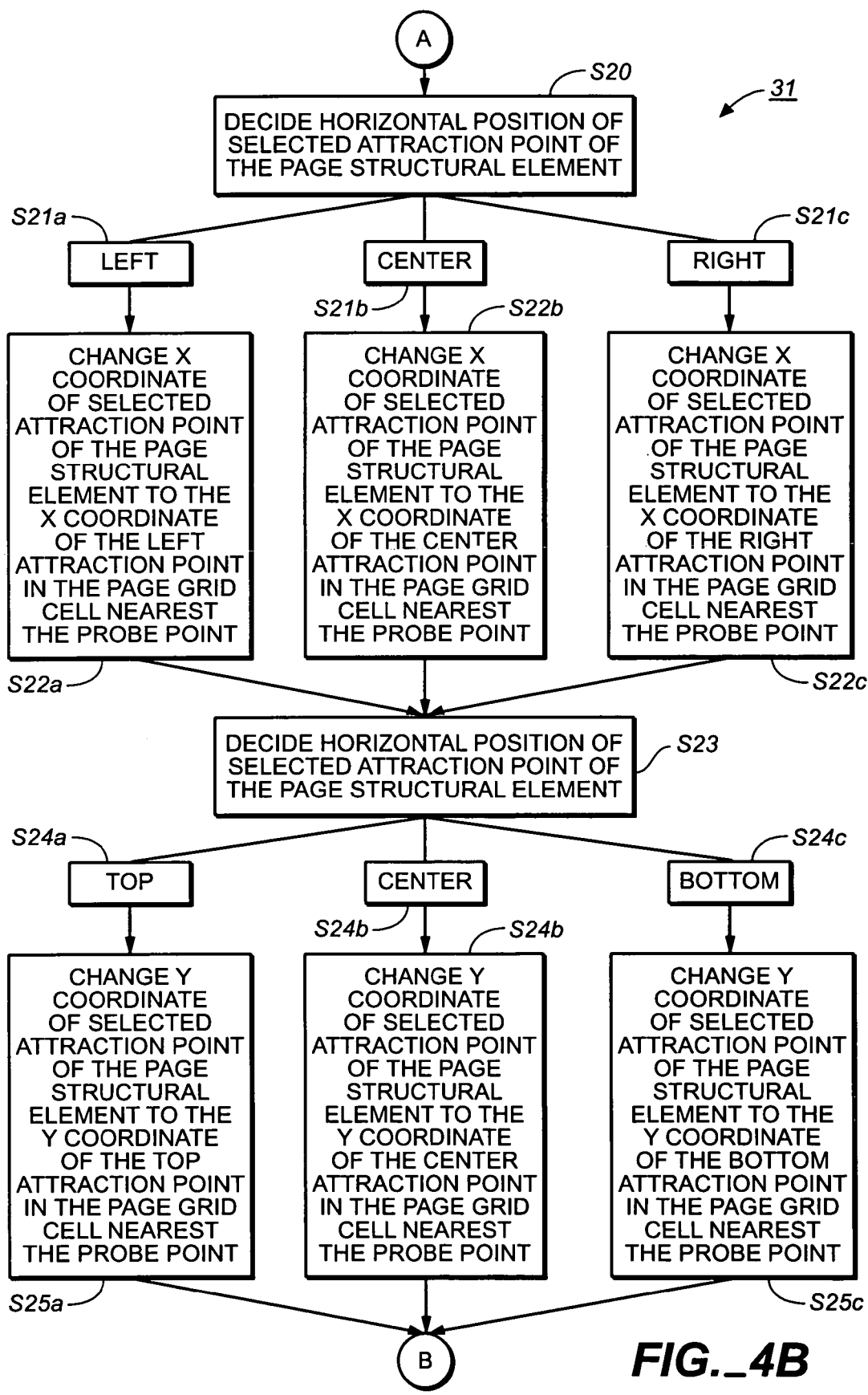
FIG._4B

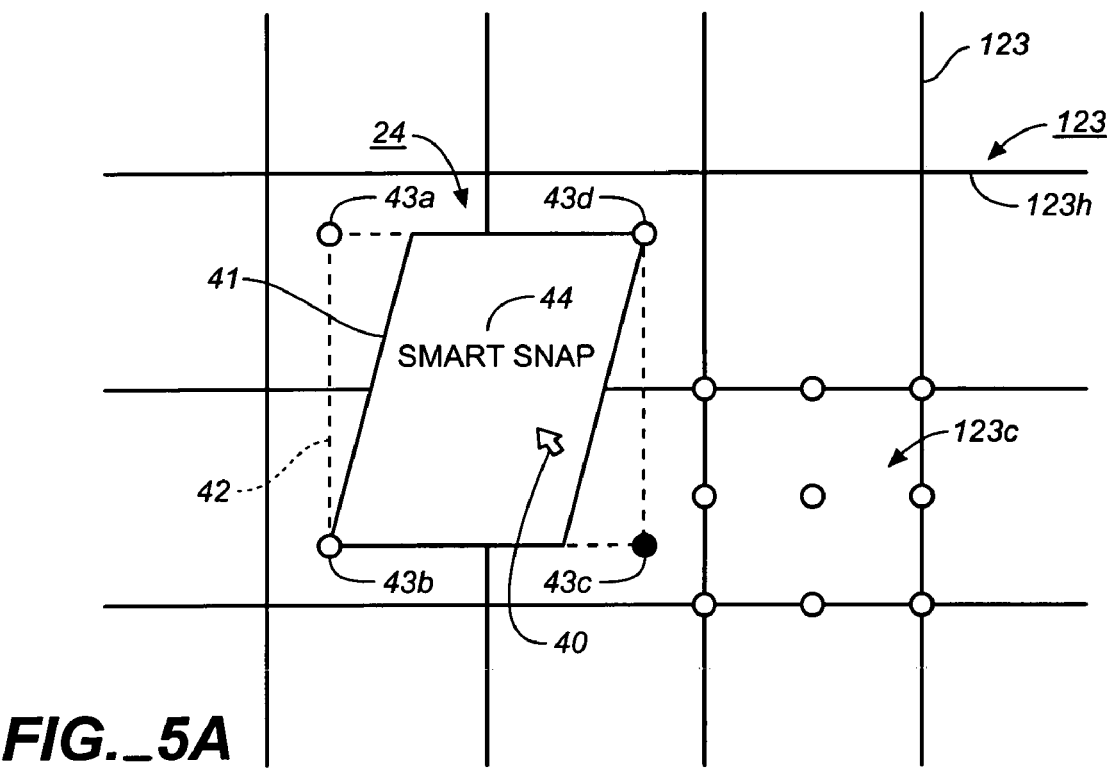
FIG._5A
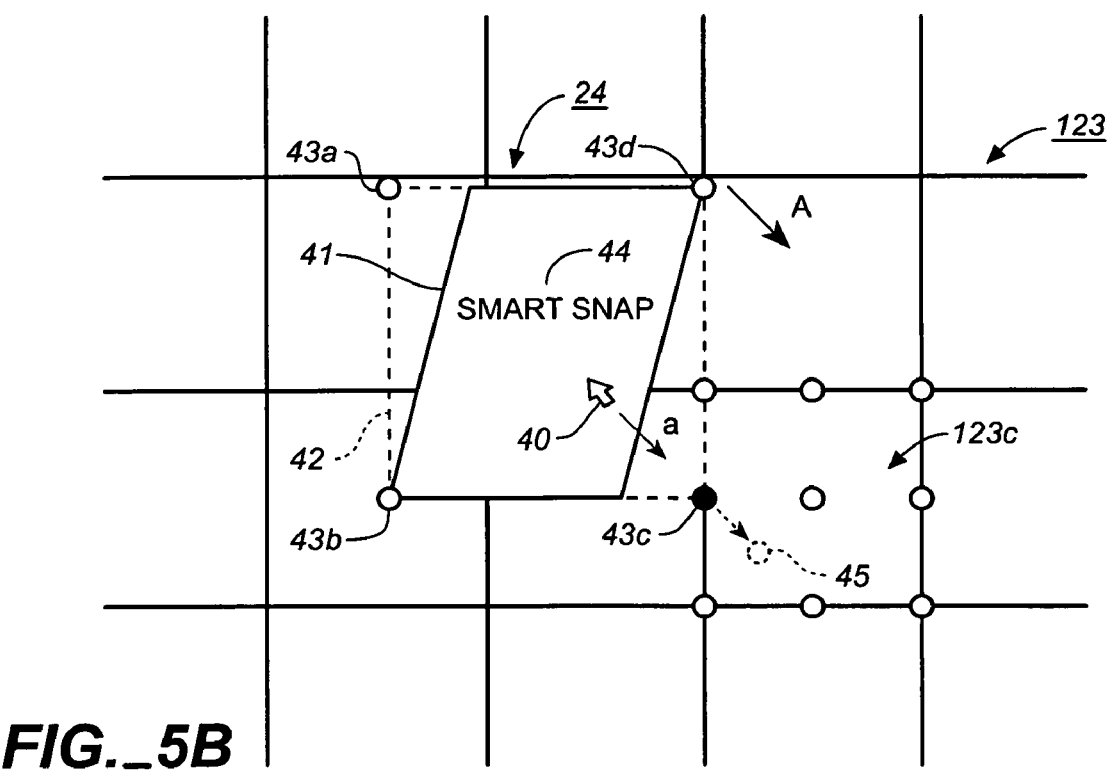
FIG._5B

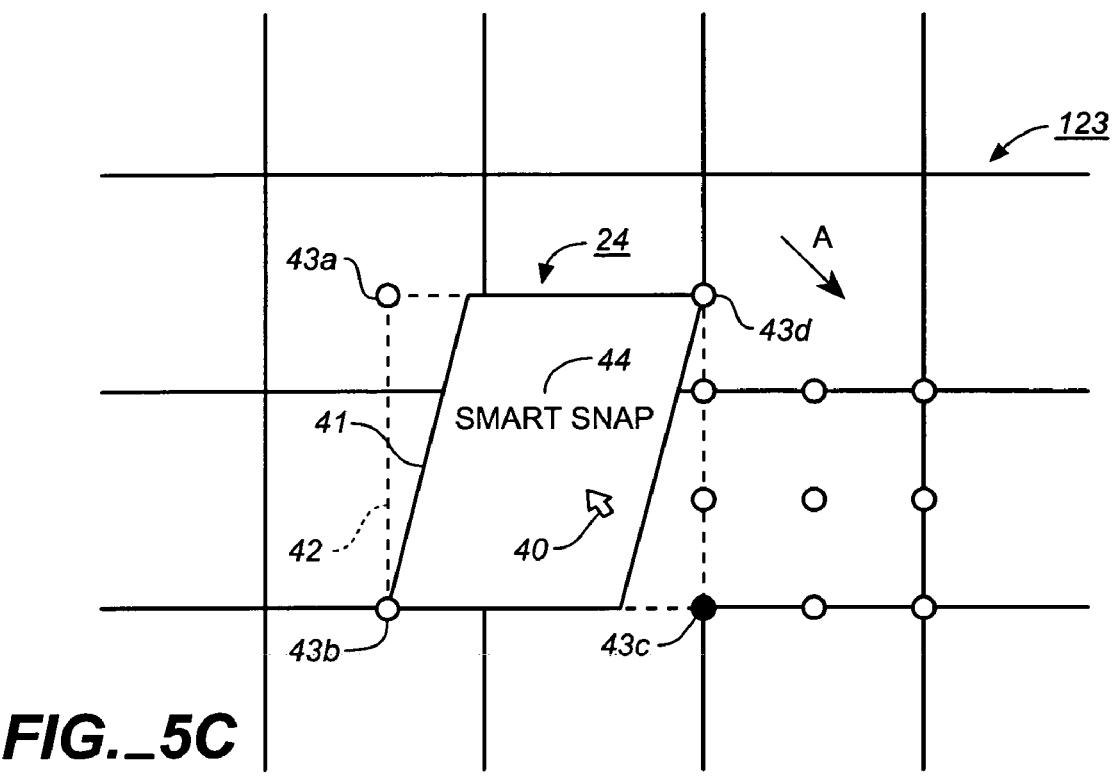
*FIG._5C*
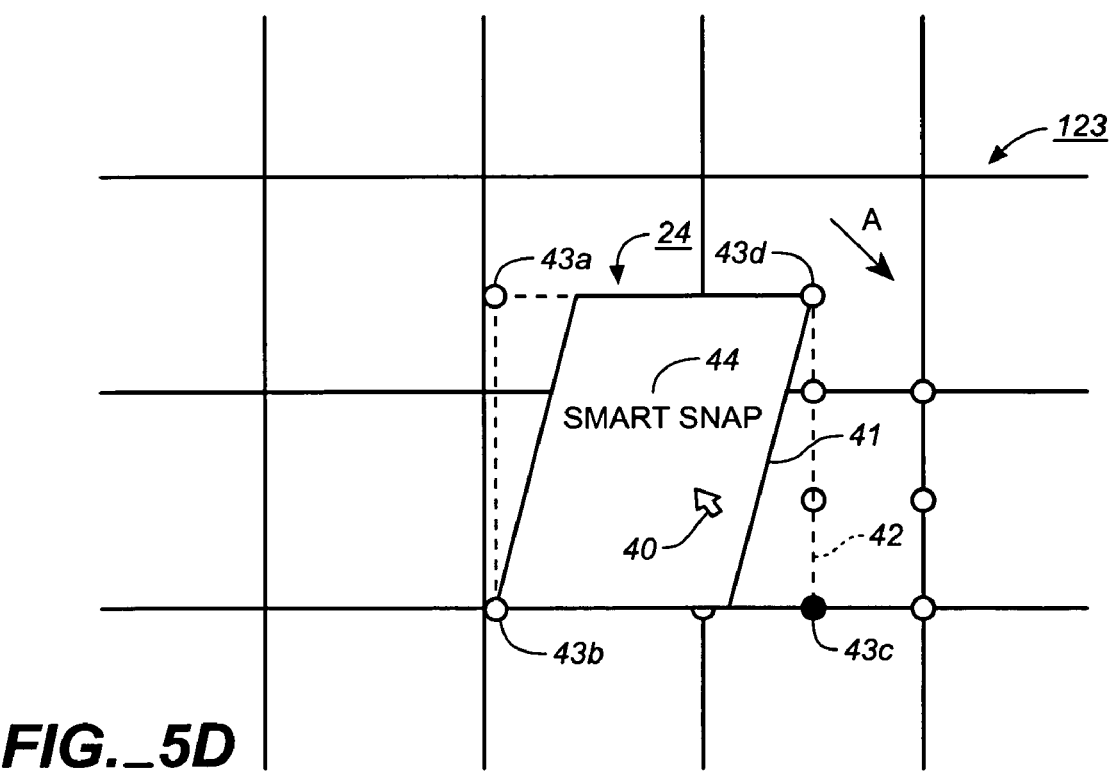
*FIG._5D*

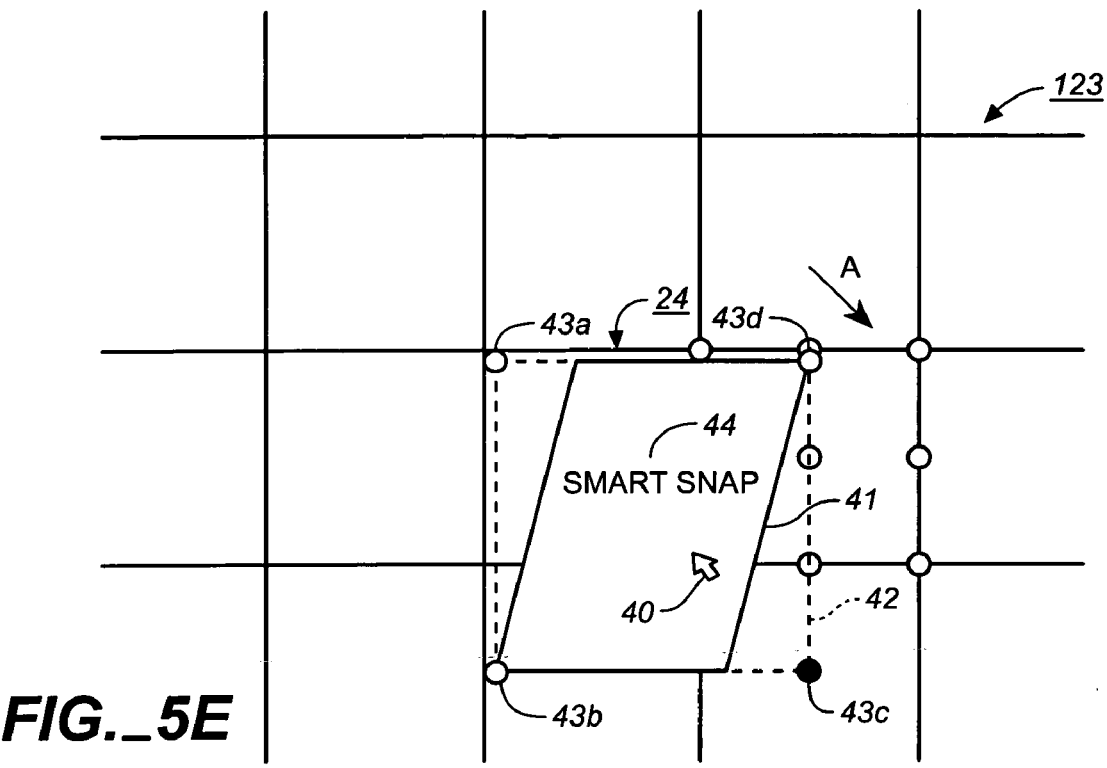
FIG._5E
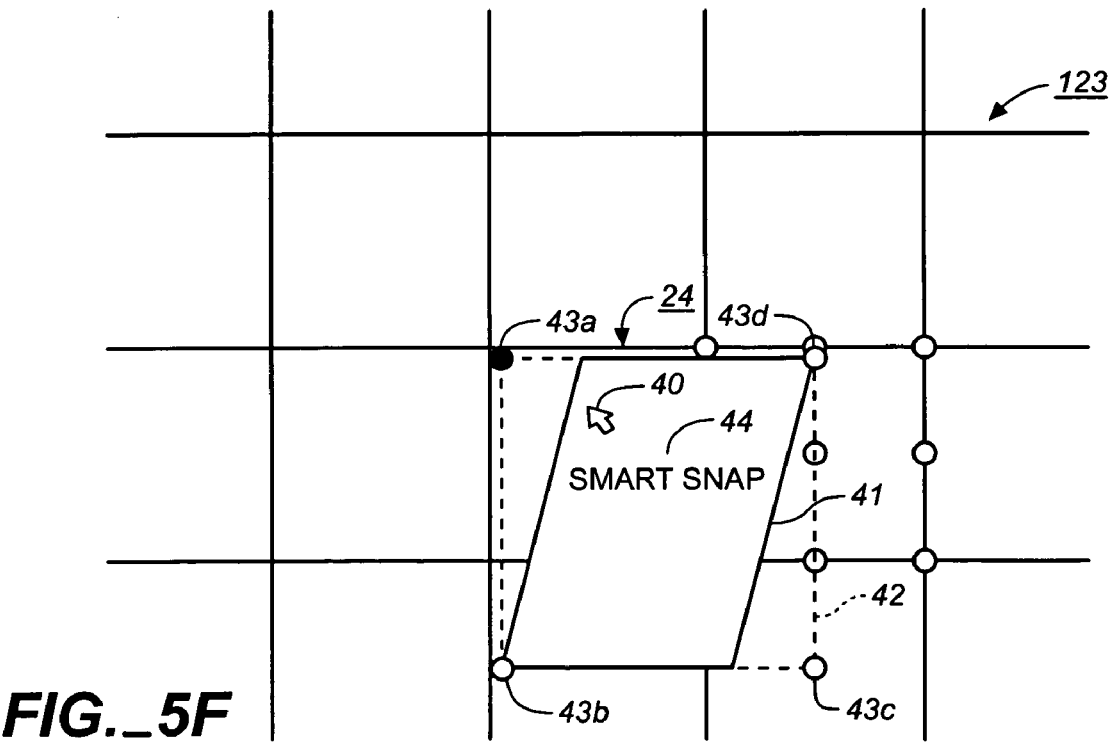
FIG._5F

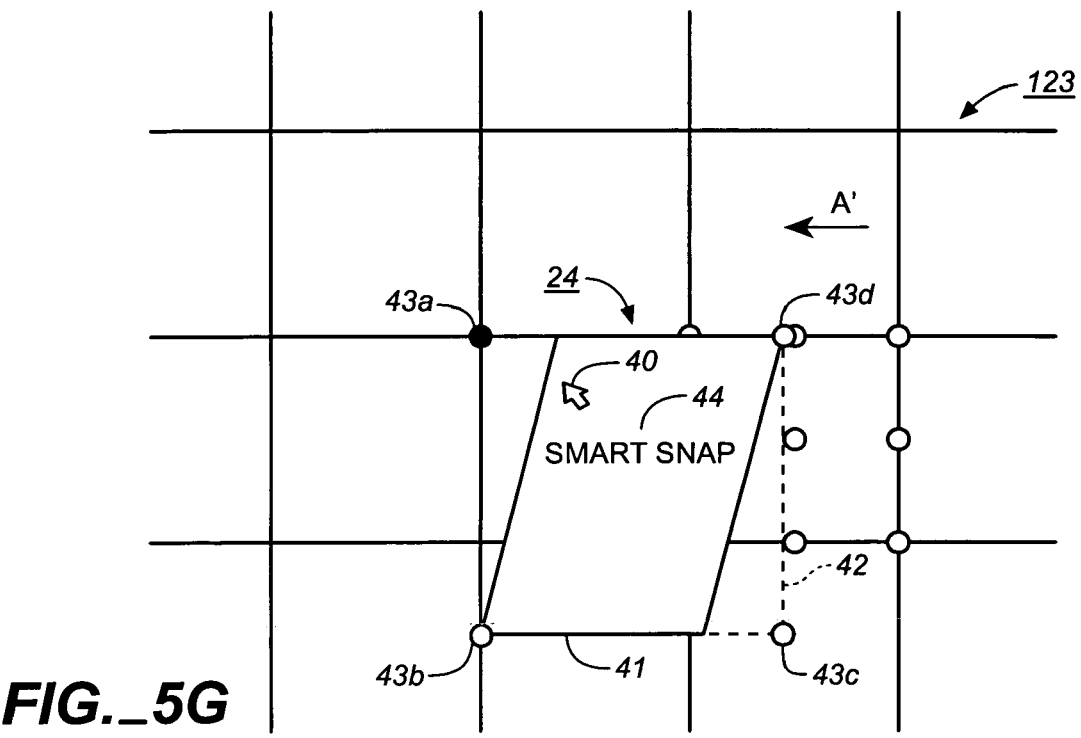
FIG._5G
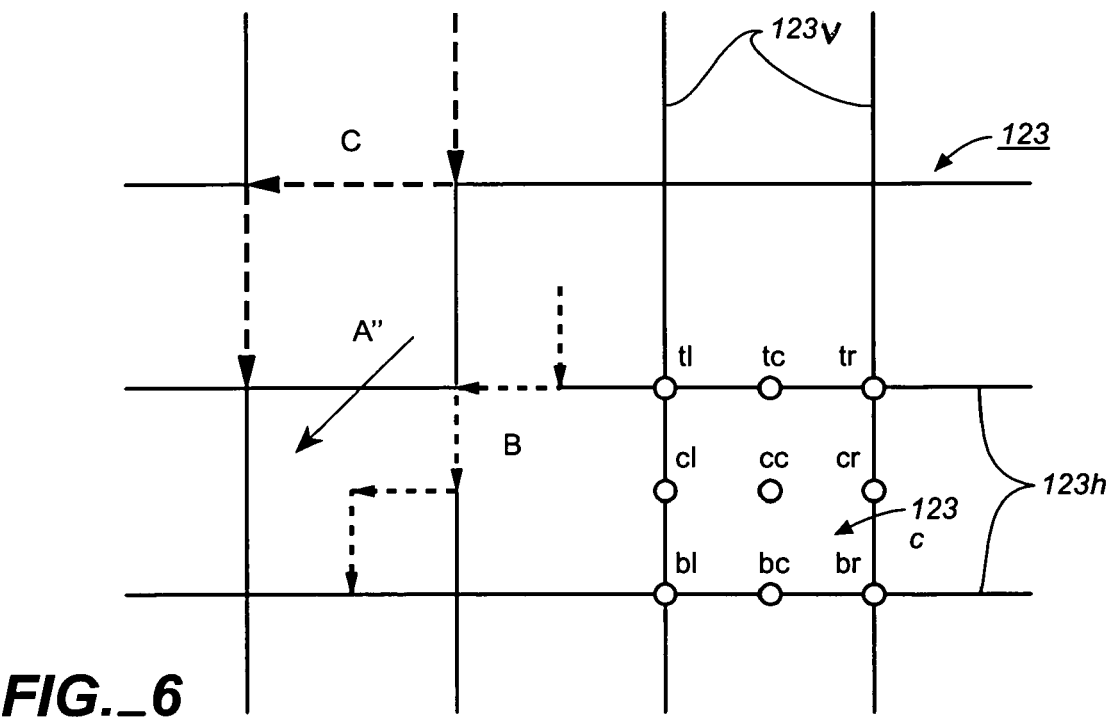
FIG._6

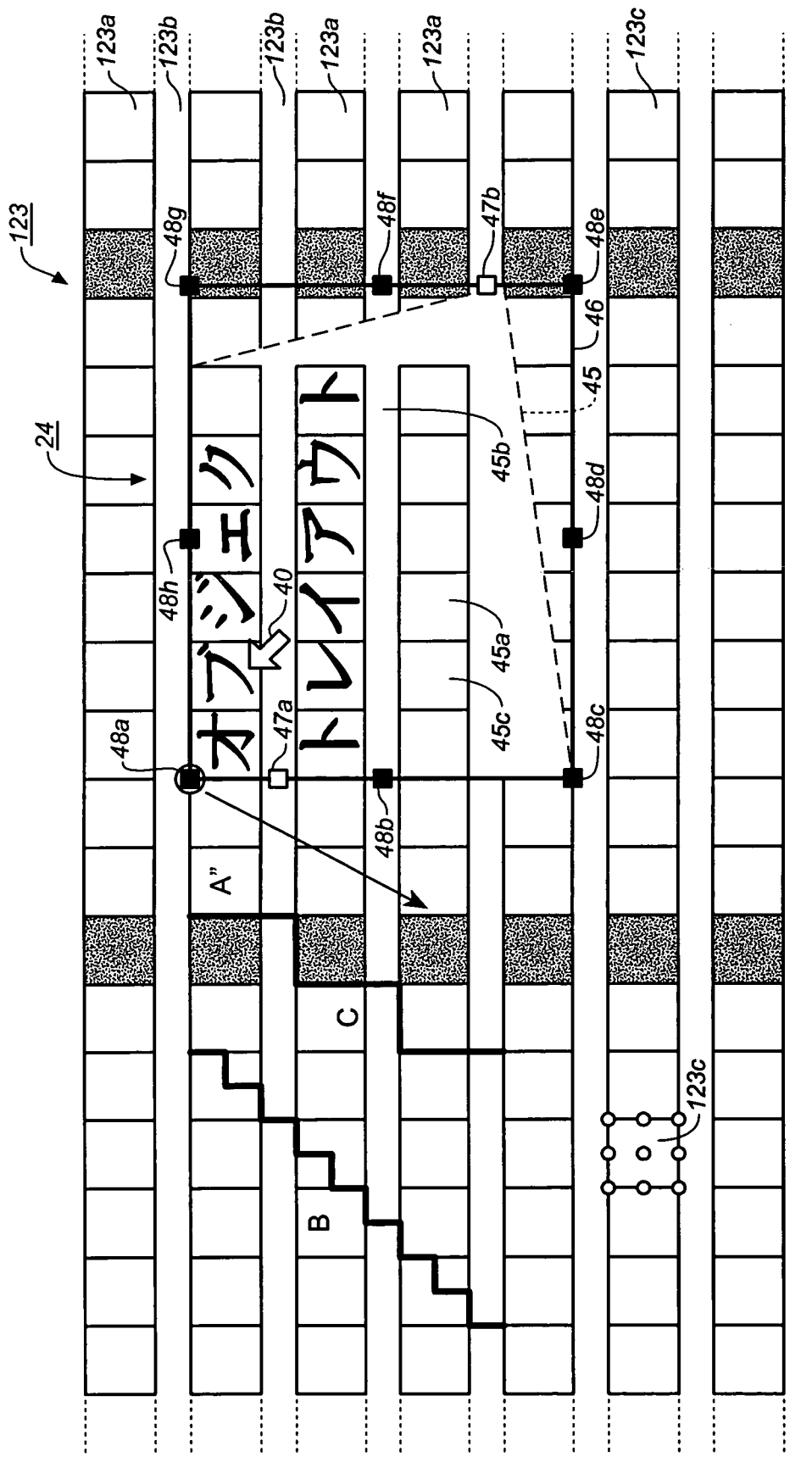
FIG._7

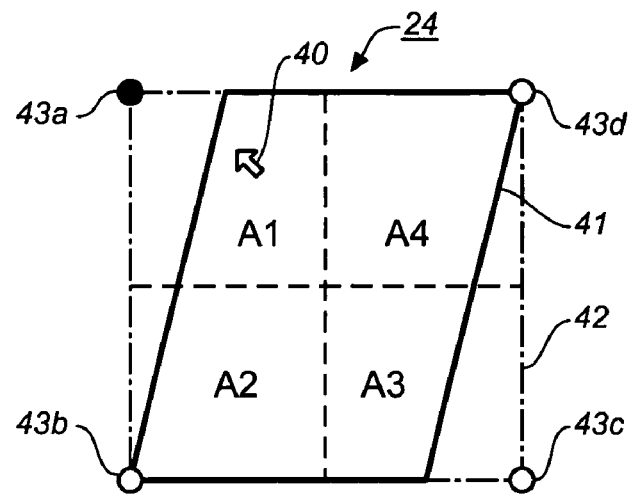
FIG._8A
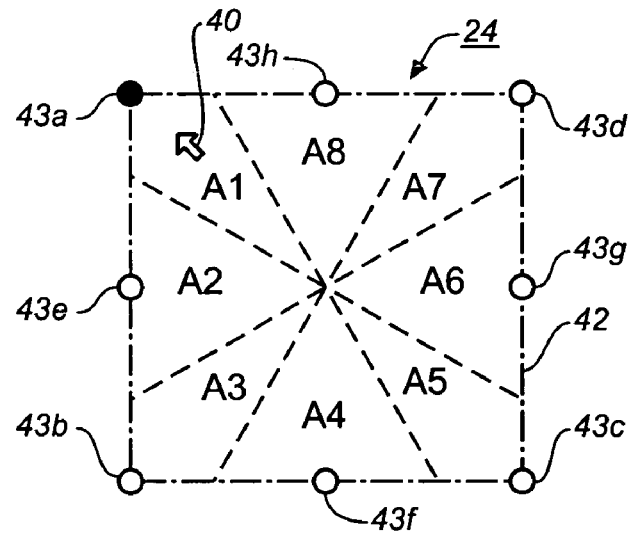
FIG._8B
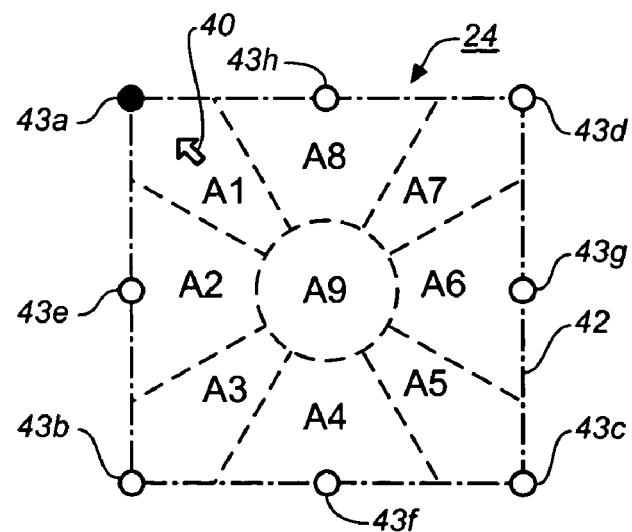
FIG._8C

SMART CORNER MOVE SNAPPING

This application claims the benefit of Provisional Application No. 60/182,132, filed Feb. 12, 2000.

TECHNICAL FIELD

This invention relates to desktop publishing (DTP) technology.

BACKGROUND

A computer used for DTP displays an electronic document of a selected size as an editing form on the screen of a CRT display device. Usually, reference lines are set in this electronic document, and these comprise a plurality of horizontal lines and a plurality of vertical lines known as a grid. Then a page structural element known as an object is formed on the screen or introduced from outside and arranged in the electronic document. An object usually comprises a frame demarcating its region and data contents such as graphics or text set inside that frame.

Precise arrangement of these types of objects in an electronic document is important in DTP. When a pointing device, such as a mouse, is used, a cursor on the screen is positioned on the object. The pointing device's button is clicked, thus holding (selecting) the object, and the mouse is operated and the object is moved with the cursor and can be moved to the desired location in the electronic document. In addition, it is also possible to move an object to the desired location by inputting the object's X and Y coordinates using a keyboard. Furthermore, the grid is provided with attraction points (known as snap points) at intersections, and the object too is provided with a plurality of attraction points. Therefore, for example, when an object is moved near the desired location by the pointing device, some of the object's attraction points are attracted to the grid's attraction points (a process known as snapping), whereby the object becomes precisely coordinated with the grid. That is, by using attraction technology it is not necessary to precisely match the object to the grid to the very end by manual operation; rather, simply by moving the object near the desired location, the object is attracted and automatically coordinates with the grid and is positioned.

This sort of attraction technology is extremely useful in layout editing for precisely positioning objects in an electronic document using a grid. Nevertheless, ordinary objects are provided with a plurality of attraction points, and particularly when the grid spacing is small relative to the size of the object, there are instances when the object's attraction points and the grid's attraction points frequently attract and the operation of positioning the object becomes complicated and imprecise. In addition, depending on the object's configuration (for example, a grid set as a manuscript writing form), the object has a plurality of attraction points so the operation of positioning it may become difficult.

SUMMARY

In one aspect, the invention is directed to a layout editing system for arranging page structural elements in an electronic document. The layout editing system has a display device, a first supply device, a second supply device, a movement device, and an attraction state control. The first supply device supplies the display device with an electronic document having a grid provided with a plurality of first attraction points for display on the display device. The second supply device supplies a page structural element whose outline is demarcated by a frame on the electronic document displayed on the display device. The page structural element is provided with a plurality of attractive second attraction points to adjust its position in accordance with the plurality of first attraction points. The movement device holds the page structural element and moves it to a desired location in the electronic document by manual user operation. The attraction state control controls the attraction of only one attraction point selected from among the plurality of second attraction points while the page structural element is being held by the movement device.

Implementations of the invention may include one or more of the following features. The movement device may be a pointing device such as a mouse or track ball, etc., and the page structural element may be kept in a held state by clicking the pointing device's button, e.g., by pressing it down. The pointing device may be linked to a cursor on the display device. When the cursor is positioned inside the frame of the page structural element and the page structural element is being held, only the second attraction point nearest the cursor may be made attractive, and other second attraction points may be set in a nonattractive state. The layout editing system may have an attractive operation mode setting mechanism to select a first attractive operation mode that sets a state of attracting to all of the plurality of first attraction points, or a second attractive operation mode that sets a state of attracting only to pre-selected points within the plurality of first attraction points. This attractive operation mode setting mechanism may include a predetermined key on the keyboard, and the second attractive operation mode may be set while this key is kept pressed down, whereas when the key is not pressed down, the first attractive operation mode may be set.

In another aspect, the invention is directed to a layout editing method for arranging page structural elements in an electronic document. In the method, an electronic document having a grid provided with a plurality of first attraction points is displayed on a display device. A page structural element whose outline is demarcated by a frame on the electronic document is also displayed on the display device. The page structural element is provided with a plurality of attractive second attraction points to adjust its position in accordance with the plurality of first attraction points. Upon detecting that the cursor is positioned inside the frame of the page structural element and that the button of a pointing device linked to the cursor is pressed down, the page structural element is held and only the second attraction point nearest to the cursor is selected in an attractive state from among the plurality of second attraction points. A probe point is set that keeps the relative positional relationship of the second attraction point and the cursor at that time. When the pointing device is operated in the holding state and the cursor is moved, the second attraction point that has been made attractive to the movement of the cursor is moved and attracted to the first attraction point nearest the probe point, and the page structural element is moved.

Implementations of the invention may include one or more of the following features. A first attraction mode may set attraction to all of a plurality of first attraction points, and a second attraction mode may set attraction only to those equivalent to a preselected pattern within the plurality of first attraction points. The first and second attraction modes may be selected according to whether a specific predetermined key on the keyboard is pressed down or released.

In another aspect, the invention is directed to an apparatus with a computer-readable storage medium tangibly embodying program instructions for causing a computer to perform the method.

In another aspect, the invention is directed to a layout editing system for arranging page structural elements in an electronic document. The layout system has a display, a memory, a moving device and a processor. The memory stores an electronic document and a page structural element to be output on the display, the electronic document having a grid provided with a plurality of first attraction points, the page structural element having a plurality of attractive second attraction points and an outline demarcated by a frame. The processor is coupled to the memory, the display and the movement device, and is configured to adjust a position of the page structural element on the display in response to user operation of the movement device such that at least one of the plurality of first attraction points tends to align with at least one of the plurality of second attraction points. The processor is further configured to cause only one second attraction point selected from the plurality of second attraction points to become attractive during operation of the movement device.

Implementations of the invention may include one or more of the following features. The movement device may include a pointing device, and the processor may be configured to cause the only one second attraction point to be selected when a bottom on the pointing device is pressed. The processor may be configured to operate in one of a first attractive operation mode and a second attractive operation mode. In the first attractive operation mode, the processor may set a state of attracting to all of the plurality of first attraction points. In the second attractive operation mode, the processor may set a state of attracting only to a selected predetermined pattern within the plurality of first attraction points. The processor may select one of the first and second attractive operation modes based on user input on a keyboard. The movement device may have a cursor displayed on the display device, and the processor may be configured to make only the second attraction point nearest to the cursor attractive when the cursor is positioned inside the page structural element frame.

Potential advantages of the invention may include one or more of the following. The invention may resolve the aforesaid prior art defects and provide a layout editing system and method with improved workability. A computer-readable recording medium may store a program for computer execution of this layout editing method.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1: A schematic block diagram showing a DTP system incorporating the inventive layout editing mechanism.

FIG. 2: A schematic block diagram showing the inventive layout editing program converted to a DTP system incorporated into a general-purpose computer system.

FIG. 3: A schematic view showing electronic document 22 having grid 23 on the screen of a display device and page structural element 24 to be laid out displayed thereon, based on one embodiment of the present invention.

FIG. 4A: A flowchart showing the procedure for the inventive layout editing processing.

FIG. 4B: A flowchart showing a branching sequence forming a part of the flowchart in FIG. 4A.

FIG. 5A: A schematic diagram showing the stage of performing layout editing processing based on one embodiment of the present invention.

FIG. 5B: A schematic diagram showing another stage of performing layout editing processing based on one embodiment of the present invention.

FIG. 5C: A schematic diagram showing another stage of performing layout editing processing based on one embodiment of the present invention.

FIG. 5D: A schematic diagram showing another stage of performing layout editing processing based on one embodiment of the present invention.

FIG. 5E: A schematic diagram showing another stage of performing layout editing processing based on one embodiment of the present invention.

FIG. 5F: A schematic diagram showing another stage of performing layout editing processing based on one embodiment of the present invention.

FIG. 5G: A schematic diagram showing another stage of performing layout editing processing based on one embodiment of the present invention.

FIG. 6: A schematic diagram showing an example of the page grid structure and cursor movement and the movement of a page structural element linked thereto based on one embodiment of the present invention.

FIG. 7: A schematic diagram showing an example of the page grid structure and cursor movement and the movement of a page structural element linked thereto based on another embodiment of the present invention.

FIGS. 8A–8C: Structural diagrams showing embodiments of the inventive attraction state control mechanism.

Like reference numbers and designations in the various drawings indicate like elements.

DETAILED DESCRIPTION

FIG. 1 shows a DTP processing system with the present invention incorporated. The DTP processing system shown in FIG. 1 has a DTP processing control device 2, which can perform typesetting processing and platemaking and so forth; a display device 3 for displaying the data being processed; a movement device or movement means 4 for moving the data displayed on display device 3 on the screen; an input means 5 for inputting various types of data used in DTP processing (for example, graphics or text data); and an output means 6 for outputting edited data.

DTP processing control device 2 has an electronic document supply device, or electronic document supply means, 2a; the electronic documents or editing forms supplied by that electronic document supply means 2a to display device 3 for display have a grid provided with a plurality of attraction points, also known as snap points. Furthermore, the grid, as will be described in detail later, consists of reference lines including a plurality of vertical lines and a plurality of horizontal lines on pages in the electronic document when displayed on display device 3; at least one page structural element, also known as a page object, is positioned on the electronic document using the grid. Two or more different grid formats may be selectively used. Attraction points are usually provided at the points where the grid's vertical lines and horizontal lines intersect; these mutually attractive attraction points are provided in the page structural element and have the function of mutually coordinating their positions.

DTP processing control device 2 also has a page structural element supply device, or supply means, 2b. This is displayed on display device 3 after graphic data or text data or the like are created by the user on display device 3 or, if previously created, is inputted via input means 5 for display on display device 3. A page structural element, as will be described in detail later, is a page object to be laid out in an electronic document displayed on display device 3, and basically has a frame demarcating its region, graphic data or text data to be included in the frame, and a plurality of attraction points. When a page structural element is displayed on display device 3, the user operates movement means 4 and moves the page structural element on the screen of display device 3 and positions it at the desired location in the electronic document. In this case, as described previously, a page structural element is provided with a plurality of attraction points, and the grid arranged in the electronic document also has a plurality of attraction points, so when the user operates movement means 4 and moves the page structural element in the electronic document, the page structural element moves while its attraction points are being attracted to the grid's attraction points.

DTP processing control device 2 also has an attraction state control, or attraction state control means, 2c. When a page structural element is moved as described above, attraction state control means 2c improves the operability of page structural element layout processing by controlling the specified state of attraction between the page structural element and the grid. That is, as will be described in detail later, according to the present invention, when a page structural element is moved by movement means 4, only one of the attraction points in the plurality of attraction points provided in the page structural element is selected and made attractive; the remaining attraction points are made nonattractive. As a result, the user's processing performance in arranging page structural elements in an electronic document is dramatically improved, and it is possible to position the page structural elements precisely. Furthermore, various types of configurations are possible to selectively configure the attraction of only one of the attraction points in the plurality of attraction points provided in the page structural element. For example, if movement means 4 is a mouse, it is possible to select and make attractive the attraction point at the distance nearest the cursor present in the page structural element when the mouse is clicked.

In addition to the aforesaid, DTP processing control device 2 also includes various other functions and components known to persons skilled in the art as necessary for ordinary DTP. Also, an electronic document that has been laid out and edited and that is finished with DTP processing is outputted via output means 6, and it is possible to perform platemaking operations, for example, using the resulting output data.

As shown in FIG. 1, the inventive layout editing system can be included as part of DTP system 1, but the inventive layout editing system can also be installed as a layout editing system in a general-purpose computer system 10 as shown in FIG. 2, or can constitute a DTP system. That is, in the embodiment shown in FIG. 2, system 10 has a CPU 11, a memory 12, a CRT 13, a hard disk 14, a keyboard 15, a mouse 16, a CD-ROM drive 17, a FD drive 18, and a printer 19. These units are interconnected via a bus 9. A layout editing program 8' is installed in system 10 via CD-ROM drive 17 or FD drive 18, and stored on hard disk 14, for example. Then, when the layout editing program 8 is started by a user operating keyboard 15 or mouse 16, it is loaded into memory 12 as shown in the diagram. Therefore CPU 11 and layout editing program 8 loaded into memory 12 coexist, and constitute a DTP processing control device that includes electronic document supply means 2a, page structural element supply means 2b, and attraction state control means 2c as shown in FIG. 1. Therefore one aspect of the present invention provides a computer-readable recording medium storing a layout editing program that can convert a general-purpose computer system into a DTP processing system.

FIG. 3 shows part of the screen display of FIG. 1's display device 3 that is possible when it is FIG. 2's CRT, for example. That is, electronic document 22 is displayed on screen 21 as an editing form, and layout editing of various types of page structural elements is performed thereon. Electronic document 22 can be displayed on screen 21 by clicking with a mouse on "file" icon 25a, for example, in a menu bar 25 displayed along the top edge of screen 21, and selecting item "new document" (not shown). Then, when electronic document 22 is displayed on screen 21, page grid 23 is displayed on electronic document 22 based on values set by questions to the user in a dialog box or as predetermined defaults. Layout grid 23 (hereinafter simply "grid") comprises reference lines used in layout editing and arranged within a page of electronic document 22. In the example shown here, grid 23 is formatted as a manuscript form for horizontal writing, but grids with various other formats exist, such as manuscript forms for vertical writing, graph paper format, etc. Grid 23 usually has a plurality of horizontal lines and a plurality of vertical lines, and also has a plurality of attraction points. Grid 23's display/nondisplay on electronic document 22 can be controlled by clicking "View" icon 25d in menu bar 25 and making a pulldown menu appear, and selecting "grid display" or "grid nondisplay" therein (not shown). Grid 23's attraction function can be used whether "display" or "nondisplay" is selected.

In FIG. 3 page structural element 24 is also disposed on electronic document 22. Page structural element 24 is created, for example, by the user clicking on grid tool 26b for the horizontal writing manuscript form format (also known as frame grid) in tool box 26 and dragging it the desired length across screen 21. Tool box 26 also has grid tool 26c for vertical writing manuscript form format and selection tool 26a for selecting objects displayed on the screen, and includes various other known editing tools. In addition, menu bar 20 also contains functions for performing common editing tasks such as copying and pasting under "Edit" 25b and functions for setting grid format and spacing and so forth under "Layout" 25d.

Incidentally, according to the present invention, as shown in FIG. 3, processing performance is improved when laying out page structural element 24 on electronic document 22 set with grid 23, and the user can easily and precisely perform layout tasks.

Next, one embodiment of the present invention's layout editing method shall be described with reference to the flowcharts in FIGS. 4A–4B and the schematic diagrams in FIGS. 5A–5G. Furthermore, in this embodiment, as shown in FIG. 5A, grid 123 set in the electronic document is graph paper format, so it has plurality of vertical lines 123v and plurality of horizontal lines 123h, and it is assumed that these vertical lines and horizontal lines are evenly spaced. Therefore, a pair of adjacent vertical lines 123v, and a pair of adjacent horizontal lines 123h, demarcate square-shaped cell 123c therein. As shown in FIG. 6, each cell 123c has nine attraction points: tl (top left), tc (top center), tr (top right), cl (center left), cc (center center), cr (center right), bl (bottom left), bc (bottom center), br (bottom right). In FIGS. 5 and 6 the nine attraction points of one cell 123c in grid 123 are shown as circles, but it should be understood that all cells similar to cell 123c in grid 123 have nine attraction points. However, the three attraction points on the boundary line at the shared boundary between adjacent cells are shared by the pair of adjacent cells. In addition, in FIGS. 5 and 6 the attraction points for one cell are shown as circles, but this is simply an example; attraction points do not necessarily have to be of this sort of size and shape, and the attraction distance of each attraction point can be set to the desired value using known technology. In addition, in this embodiment each cell has nine attraction points, but the number of attraction points each cell has can be set to an optional number other than nine.

In addition, in the embodiment described in FIGS. 4 and 5 page structural element 24 has (1) frame 41 demarcating its region, (2) text data 44 included in that region, (3) surrounding box 42 (also known as a bounding box), which comprises a pair of horizontal lines indicating frame 41's height and a pair of vertical lines indicating its width, and (4) four attraction points 43a~43d. In the example shown here frame 41 is trapezoidal, but surrounding box 42 is always rectangular. The four attraction points 43a~43d are respectively positioned at the four corners of surrounding box 42. Incidentally, in FIGS. 5 and 6 the respective attraction points on grid 123 and page structural element 24 are shown as circles for convenience in explanation, but the attraction points do not always have to be displayed on screen 21 as circles.

FIG. 5A shows the situation when page structural element 24 is created on grid 123. In addition, it shows that the user has operated the mouse and positioned its cursor 40 inside frame 41 of page structural element 24. If the user clicks the mouse—that is, presses down on the mouse's left button (step S1)—in this state, cursor 40 holds page structural element 24 (i.e., selects it), and if the mouse's left button continues to be held down in this state, only the attraction point nearest in distance to cursor 40 (attraction point 43c in this case) of the four attraction points 43a~43d in page structural element 24 is set to be attractive, and the remaining three attraction points 43a, 43b, and 43d are set to be nonattractive (step S2). Only attraction point 43c is set to be attractive, so in FIG. 5A attraction point 43c is shown converted to a black circle. In grid 123, meanwhile, as described previously, each cell 123c has nine attraction points, shown here as white circles; which are assumed to be always kept in an attractive state. At this point in time page structural element 24's selected attraction point 43c sets a probe point whose positional relationship relative to cursor 40 does not change. That is, the probe point is an imaginary point, and when the mouse is clicked and page structural element 24 is held—that is, selected—by cursor 40, this selects attraction point 43, which is nearest in distance to cursor 40, the probe point can be defined as the point which maintains the relative positional relationship of cursor 40 and attraction point 43c at this time.

Next, as shown in FIG. 5B, when the user drags the mouse and moves it in the direction indicated by arrow A on the screen, cursor 40, which is linked to the mouse movement, starts to move in the direction indicated by arrow a (parallel to arrow A) (step S3). When this happens, the position of the probe point, which changes with the movement of cursor 40, is determined (step S4), and in this case, as shown in FIG. 5A, the probe point position is at almost exactly the same position as attraction point 43c, and the probe point (in this case, attraction point 43c) is nearest to cell 123c's center left attraction point cl, so the X coordinate of the selected attraction point 43c is changed to the X coordinate of center left attraction point cl in cell 123c (step S6). Next, the Y coordinate of the selected attraction point 43c is changed to the Y coordinate of center left attraction point cl in cell 123c (step S7). As a result, page structural element 24 is attracted so that the selected attraction point 43c coordinates its position with cell 123c's center left attraction point cl and moves to the position shown in FIG. 5B. Furthermore, in this case the attraction mode correction key was pressed down in decision step S5, so it can be assumed that attractive operation mode 1 was selected.

Next, if the user keeps the mouse button pressed down (step S9), and, as shown in FIG. 5B, if the user drags the mouse farther in the direction of arrow A and moves cursor 40 in the direction of arrow a (step S10), the program loops back to step S3 and determines the position of probe point 45 relative to the new position of cursor 40 (step S4). Then, as described previously, attractive operation mode 1 is currently set, so the program advances to steps S6 and S7. In this case, if the user continues to drag the mouse as shown in FIG. 5B, page structural element 24's attraction point 43c remains attracted to cell 123c's center left attraction point cl and its position does not change, but as cursor 40 gradually moves over page structural element 24 in the direction of arrow a, probe point 45 maintains its relative positional relationship with the cursor and moves in the same direction. Then, when the movement of probe point 45 brings it nearest to cell 123c's bottom left attraction point bl, the X coordinate of selected attraction point 43c is changed to the X coordinate of 123c's bottom left attraction point bl (step S6), and then the Y coordinate of selected attraction point 43c is changed to the Y coordinate of 123c's bottom left attraction point bl (step S7), and as a result selected attraction point 43c is attracted to cell 123c's bottom left attraction point bl, and page structural element 24 moves to the position shown in FIG. 5C (step S8).

If the user continues to drag the mouse farther in the same direction, page structural element 24 keeps the position shown in FIG. 5C for a short while, but cursor 40 and probe point 45, which keeps the relative positional relationship that it initially had with the cursor, continue to move in the direction of arrow a, so ultimately the probe point becomes nearest to cell 123c's bottom center attraction point bc. Therefore, as in the previously described step, the X and Y coordinates of selected attraction point 43c are changed to the X and Y coordinates of cell 123c's bottom center attraction point bc, and as a result, attractive operation occurs, and page structural element 24 jumps to the position shown in FIG. 5D. If the user continues to drag the mouse in the same direction, this processing step is repeated, and page structural element 24 jumps and moves from the position shown in FIG. 5D to the position shown in FIG. 5E. Furthermore, as shown in FIG. 5E, all of grid 123's attraction points are attractive, but of attraction points 43a~43d at the four corners of page structural element 24, only attraction point 43c nearest cursor 40 is attractive; the other three points 43a; 43b, and 43d are nonattractive; consequently, only attraction point 43c is attracted to one corresponding attraction point on grid 123; none of the remaining three attraction points 43a, 43b, and 43d are attracted to any attraction point on the grid. If the user releases the pressed-down mouse button after moving to the position shown in FIG. 5E, program 30 branches from step S9 to step S11.

Next, let us assume that the user moves the mouse without clicking the button and positions the cursor as shown in FIG. 5F, near the top left corner inside the frame 41 region of page structural element 24, and then clicks the mouse button (step S1). As a result, in this case the page structural element 24 attraction point nearest cursor 40 is attraction point 43a, so attraction point 43a is selected, and a probe point is set to keep unchanged the current position of attraction point 43a and cursor 40 (step S2). Therefore, in this case, only attraction point 43a is set in an attractive state, and the remaining three attraction points 43b, 43c, and 43d are set to be nonattractive, so only attraction point 43a is shown as a black circle.

Next, as shown in FIG. 5G, if the user drags the mouse in order to move on the screen in the direction indicated by arrow A', cursor 40 starts to move in the direction of arrow A' (step S3), and as a result the new probe point position relative to the new cursor 40 position is determined (step S4). Then, as described previously, attractive operation mode 1 is selected in this example, so in decision step S5 the program branches to "Y", and the X coordinate of selected attraction point 43a is changed to the X coordinate of cell 123c's top left attraction point tl, which is nearest to the probe point (step S6), and the Y coordinate is similarly changed to the Y coordinate of cell 123c's top left attraction point tl (step S7), and as a result page structural element 24 is attracted to the position shown in FIG. 5G and moves (step S8).

As described above, page structural element 24 usually has a plurality of attraction points, but according to the present invention, when a page structural element is held or selected by a mouse click or the like, only a single attraction point nearest cursor 40 is made attractive, and all of the remaining attraction points are made nonattractive. Thus, in this manner, of the plurality of attraction points of page structural element 24, only the single attraction point nearest in distance to cursor 40 is made attractive, so the user operation of laying out page structural element 24 is dramatically improved. That's because page structural element 24 is selected by cursor 40 when laying out page structural element 24 on the screen, and moreover the only attraction point made attractive is the one nearest the cursor position, which currently has the highest interest within page structural element 24 because of performing layout, so the user can precisely and swiftly grasp the relative positional relationship between grid 123 and page structural element 24.

In this manner, one feature of the present invention is that only one of page structural element 24's plurality of attraction points is selectively made attractive, but it is also possible to achieve a distinctive effect by also providing grid 123 with a plurality of attraction points and selectively making these grid attraction points attractive. For example, as shown in FIG. 6, grid 123's cells 123c each have nine attraction points. In the usual state, all of the attraction points are kept attractive. Therefore, in the embodiment shown in FIG. 6 for example, if cursor 40 is moved in the direction indicated by arrow A" while holding (selecting) page structural element 24, page structural element 24 moves along the stairstep-like route indicated by dotted line B. That is, cursor 40 as operated by the user moves smoothly along a slanted line from top right to bottom left (arrow A"), but page structural element 24, whose movement is linked to the movement of cursor 40, is always coordinated with grid 123 and moves while jumping from one grid attraction point to the next attraction point because of the attraction operation. Incidentally, moving page structural element 24 along route B in this manner is very effective when it is necessary to precisely position it on grid 123, but sometimes the user wants to move page structural element 24 over a relatively long distance, and in this sort of situation it moves along route B so the attraction operation is repeated frequently and page structural element 24 jumps frequently and is difficult to look at. Therefore, in another preferred embodiment of the present invention, only selected attraction points corresponding to a predetermined pattern among grid 123's plurality of attraction points are made attractive; this makes it possible to reduce the number of times the attraction operation occurs, even when page structural element 24 is moved over a relatively long distance. Using FIG. 6 as an example of this, for example, as shown by route C, only the attraction points at the intersections of grid 123 are made attractive, and the other attraction points are set to be nonattractive. By controlling the attractive state of attraction points in grid 123 in this manner it is possible to always perform optimal movement control of page structural element 24 according to the situation: when fine positioning is necessary, when it has to be moved over a long distance, etc.

Next, with reference to FIGS. 4B and 7, another embodiment of the present invention shall be explained. The series of procedures shown in FIG. 4B constitutes part of the flowchart shown in FIG. 4A. It is a routine branched to when the decision result in decision step S5 is "N". That is, decision step S5 is a step that branches according to whether the "attractive mode correction key" is down (pressed), and thus "Y" (i.e. "first attractive operation mode") or "N" (i.e., "second attractive operation mode"). When attraction state control is performed in the present invention, only a single one of the plurality of attraction points in page structural element 24 satisfying a specified parameter (for example, nearest in distance to cursor 40) is made attractive, and all of the other attraction points are set to be nonattractive. Referring to FIG. 4A, in the first embodiment of the present invention the first attractive operation mode was set as described previously, so a single attraction point set to be attractive can be attracted to any attraction point on grid 123. On the other hand, for example, depending on the format of grid 123, there are instances when it is more desirable that page structural element 24's single attractive attraction point be attracted to a specific predetermined pattern among grid 123's plurality of attraction points rather than be attracted to all of grid 123's attraction points. For example, the case shown in FIG. 7, where grid 123 has a plurality of horizontal lines 123a and a plurality of gaps 123b disposed between them at specified intervals is an example when using this is desirable.

FIG. 7 shows part of page grid 123 displayed on the screen, with page structural element 24 disposed thereon. In this case, page structural element 24 has frame 45 demarcating its region, rectangular surrounding box 46 demarcated by the height and width of frame 45, and eight attraction points 48a~48h (shown as black squares) arranged on surrounding box 46. Also, a text grid corresponding to grid 123 is demarcated inside frame 45, and this text grid has a plurality of horizontal lines 45a and a plurality of gaps 45b disposed between them at specified intervals, and each horizontal line 45a has a plurality of character frames 45c. As shown in the drawing, each character frame 45c can accommodate one character. In addition, in this example text inflow port 47a and text outflow port 47b are provided in frame 45 of page structural element 24; by using these it is possible to flow text into or out of frame 45. FIG. 7 shows the state when text is written in the first two horizontal lines.

Also, as shown in FIG. 7, cursor 40 is positioned inside frame 45, and if page structural element 24 is held (selected)

by the user clicking the left mouse button, for example, in this state, only attraction point 48*a*, which is nearest the current position of cursor 40, is selected and made attractive in accordance with the basic principle of the present invention, and the other attraction points 48*b*~48*h* are made nonattractive. Therefore, a circle is drawn around attraction point 48*a* in FIG. 7 to reflect this state.

Suppose that the user moves cursor 40 in the direction of arrow A" in this state. In this case, with reference to FIG. 4A, if the attraction function is activated in accordance with the previously described embodiment, page structural element 24 moves while jumping between attraction points along stairstep-like route B in FIG. 7. That's because each cell 123*c* in FIG. 7's grid 123 has nine attraction points that can be attractive. Nevertheless, because of the nature of the format of grid 123 shown in FIG. 7, when moving along route B the text grid inside page structural element 24 often does not match up with the electronic document's grid 123, and the layout operation probably becomes complicated and difficult. That's because in the FIG. 7 case it's thought desirable to do layout operations with the text grid inside page structural element 24 and the electronic document's layout grid 123 always coinciding. The routine shown in FIG. 4B provides a layout editing configuration that can be effectively used in exactly this sort of situation.

That is, decision step S5 in FIG. 4A detects if the "attractive mode correction key" is pressed down, and if it decides that the user has set the second attractive operation mode, the program branches to the FIG. 4B routine. First of all, it decides if the horizontal position of page structural element 24's selected attraction point 48*a* is "left" or "center" or "right". In this case attraction point 48*a* has a horizontal position on the "left" side (step S21*a*), so the X coordinate of page structural element 24's selected attraction point 48*a* is changed to the X coordinate of grid cell 123*c*'s top left attraction point tl, which is nearest the probe point (step S22*a*). In addition, the vertical position of page structural element 24's selected attraction point 48*a* is "top" (step S24*a*), so the Y coordinate of page structural element 24's selected attraction point 48*a* is changed to the Y coordinate of grid cell 123*c*'s top left attraction point tl, which is nearest the probe point. By repeating this procedure, page structural element 24 moves along stairstep-like route C. In this case, when page structural element 24 moves intermittently due to attraction, the text grid therein is always kept in a coordinated state with layout grid 123. Therefore the attraction distance is relative coarse but the layout operation becomes easier to do.

Incidentally, a key provided on an ordinary keyboard and normally used for switching layout editing functions, such as the CTRL key or ALT key, can be used as the "attraction mode correction key" that switches between the first and second attractive operation modes in this way. In this case, for example, the first attractive operation mode is set when the user keeps the specified key pressed down, and the second attractive operation mode is set when the key is released. In addition, in another embodiment it is set as an item on a pulldown menu, and the operation mode can be set by clicking this with a mouse, or an attractive operation mode setting tool can be provided in a tool box.

Next, some specific configurations that can perform attraction state control in the present invention shall be described with reference to FIG. 8. A feature of the present invention is that it provides an attraction state control function such that when selecting (holding) a page structural element with a plurality of attraction points by clicking with a pointing device such as a mouse, etc., only the single attraction point nearest the cursor's current position inside the frame of the page structural element is made attractive, but there are a number of configurations for selecting a specified one of the plurality of attraction points when doing so.

For example, in the configuration shown in FIG. 8(A), page structural element 24 has frame 41 demarcating a region that includes text or graphic data, etc., and frame 41 can be set in an optional shape. In addition, page structural element 24 has rectangular surrounding box 42, determined by the height and width of frame 41. The surrounding box, by definition, always takes the rectangular shape demarcated by the pair of horizontal lines and the pair of vertical lines. In addition, page structural element 24 has a plurality (four in this case) of attraction points 43*a*~43*d*, and in this case one attraction point 43 is disposed in each corner of surrounding box 42. Also, in this configuration surrounding box 42 is divided into four equal quadrants A1~A4, and the attraction point nearest cursor 40 is selected according to which quadrant cursor 40 is positioned in. In addition, it should be noted that cursor 40 being positioned inside frame 41 is a precondition for setting page structural element 24 in a held state by clicking the pointing device.

FIG. 8(B) shows another configuration of the attraction state control function; in this case frame 41 is dispensed with for ease of explanation. In this configuration page structural element 24 has eight attraction points 43*a*~43*h*, and of these, attraction points 43*a*~43*d* are disposed at the respective corners of surrounding box 42, and the remaining four attraction points 43*e*~43*h* are disposed on the respective sides of the surrounding box in the middle between corners. In this case too surrounding box 42 is divided into eight equiangular quadrants A1–A8 around the center, and the single attraction point is selected according to which quadrant cursor 40 is in.

FIG. 8(C) shows a modification of the FIG. 8(B) embodiment. In this case, circular region A9 is formed around the center of surrounding box 42, and when cursor 40 is located inside this circular region A9 none of the attraction points is selected. It is sometimes not clear which attraction point is selected when the user clicks a pointing device near the center of page structural element 24's frame, so this modification contributes to clarifying which attraction point is selected. As shown in this embodiment, the regions associated with each attraction point do not all have to have the same shape, and it is possible to provide an empty region that is not associated with an attraction point in part of the frame 41 region.

The embodiments shown in FIGS. 8(A)~(C) show instances in which a plurality of attraction points 43 is disposed on surrounding box 42, but it is also possible to dispose a plurality of attraction points 43 on frame 41 as another embodiment. In this case, it is possible for the surrounding box 42 to be eliminated. In addition, in the embodiments described above the region of page structural element 24's surrounding box 42 (or frame 41) was divided, and a single attraction point was selected by deciding which specified region cursor 40 was positioned in, but as another configuration it is possible to calculate the linear distance between cursor 40 located in the frame and each attraction point and to select the attraction point having the smallest linear distance.

Specific embodiments of the present invention were described in detail above, but the present invention is not limited to these specific configurations, and can take various modifications without departing from the scope of the present invention.

A number of embodiments of the invention have been described. Nevertheless, it will be understood that various modifications may be made without departing from the spirit and scope of the invention. Accordingly, other embodiments are within the scope of the following claims.

What is claimed is:

1. A layout editing system for arranging page structural elements in an electronic document, comprising:
   a display device;
   a first supply device to provide an electronic document having a plurality of first attraction points arranged on a grid to the display device;
   a second supply device to provide a page structural element on the electronic document, the page structural element having a plurality of second attraction points to adjust a position of the page structural element;
   a movement device to move said page structural element without deformation to a desired location in said electronic document in response to a manual user operation; and
   an attraction state control to control attraction of the plurality of second attraction points that can be activated so that only a single one of the plurality of second attraction points is set as attractive to snap the page structural element to a first attraction point while said page structural element is being moved by said movement device and the remaining second attraction points of the plurality of second attraction points are set as non-attractive.

2. The layout editing system of claim 1, wherein said movement device comprises a pointing device, and said page structural element is kept in a held state by keeping said pointing device's button pressed down.

3. The layout editing system of claim 1, further comprising an attractive operation mode setting mechanism to selectively set a first attractive operation mode that sets a state of attracting to all of said plurality of first attraction points, and a second attractive operation mode that sets a state of attracting only to a selected predetermined pattern within said plurality of first attraction points.

4. The layout editing system of claim 3, wherein said attractive operation mode setting mechanism comprises a predetermined specified key on the keyboard, and said second attractive operation mode is set by holding said specified key pressed down.

5. The layout editing system of claim 1, wherein said movement device comprises a cursor displayed on said display device, and said attraction state control activates only a single second attraction point nearest to said cursor attractive when said page structural element is being held by said movement device.

6. The layout editing system of claim 1, wherein the page structural element is demarcated by a frame.

7. A layout editing method for arranging page structural elements in an electronic document, comprising:
   displaying an electronic document having a plurality of first attraction points arranged on a grid;
   displaying a page structural element on the electronic document, the page structural element having a plurality of second attraction points;
   holding said page structural element and activating a single one of the plurality of second attraction points such that only a single second attraction point nearest to a cursor is in an attractive state a button of a pointing device linked to the cursor is pressed down at a time of detecting the cursor position; and
   when said pointing device is operated in a holding state and said cursor is moved, linking the page structural element to movement of said cursor and moving said page structural element without deformation such that the single second attraction point is set as attractive to snap the page structural element to a first attraction point and the remaining second attraction points of the plurality of second attraction points are set as non-attractive.

8. The layout editing method of claim 7, further comprising the step of selecting a first attractive operation mode that sets a state of attracting to all of said plurality of first attraction points, and a second attractive operation mode that sets a state of attracting only to a selected predetermined pattern within said plurality of first attraction points.

9. The layout editing method of claim 8, wherein said first or second attractive operation mode is selected depending on whether a predetermined specified key on the keyboard is pressed down or released respectively.

10. An apparatus comprising a computer-readable storage medium tangibly embodying program instructions for causing a computer to:
    display an electronic document having a plurality of first attraction points arranged on a grid;
    display a page structural element on the electronic document, the page structural element having a plurality of second attraction points;
    hold said page structural element and activating activate a single one of the plurality of second attraction points such that only a single second attraction point nearest to a cursor is in an attractive state, when a button of a pointing device linked to the cursor is pressed down at a time of detecting the cursor position; and
    when said pointing device is operated in a holding state and said cursor is moved, link the page structural element to movement of said cursor and move said page structural element without deformation such that the single second attraction point is set as attractive to snap the page structural element to a first attraction point and the remaining second attraction points of the plurality of second attraction points are set as non-attractive.

11. The apparatus of claim 10, further comprising instructions to cause the computer to select one of a first attractive operation mode and a second attractive operation mode, the first attractive operation mode setting a state of attracting to all of said plurality of first attraction points, the second attractive operation mode setting a state of attracting only to a selected predetermined pattern within said plurality of first attraction points.

12. The apparatus of claim 11, wherein said first or second attractive operation mode is selected depending on whether a predetermined specified key on the keyboard is pressed down or released respectively.

13. A layout editing system for arranging page structural elements in an electronic document, comprising:
    a display;
    a memory that stores an electronic document and a page structural element to be output on the display, the electronic document having a plurality of first attraction points arranged on a grid, the page structural element having a plurality of attractive second attraction points;
    a movement device; and
    a processor coupled to the memory, the display and the movement device, the processor configured to adjust a position of the page structural element, without deforming the page structural element, on the display in response to user operation of the movement device such that at least one of the plurality of first attraction points tends to align with at least one of the plurality of second attraction points, the processor further configured to control the attraction of the plurality of second attraction points that can be activated such that only a single one of the plurality of second attraction points is set as attractive to snap the page structural element to a first attraction point and the remaining second attraction points of the plurality of second attraction points are set as non-attractive while said page structural element is being moved by the movement device.

14. The layout editing system of claim 13, wherein the movement device comprises a pointing device, and the processor is configured to cause the only one second attraction point to be selected when a button on the pointing device is pressed.

15. The layout editing system of claim 13, further comprising a keyboard, and wherein the processor selects one of the first and second attractive operation modes based on user input on the keyboard.

16. The layout editing system of claim 13, wherein said movement device comprises a cursor displayed on said display device, and the processor is configured to activate only a single second attraction point nearest to said cursor attractive when the page structural element is being held by said movement device.

17. The layout editing system of claim 6, wherein said movement device comprises a cursor displayed on the display device, and the attraction state control activates only a single second attraction point nearest to the cursor attractive when the cursor is positioned inside the page structural element frame and the page structural element is being held by the movement device.

* * * * *

UNITED STATES PATENT AND TRADEMARK OFFICE
CERTIFICATE OF CORRECTION

PATENT NO. : 6,993,709 B1
APPLICATION NO. : 09/658742
DATED : January 31, 2006
INVENTOR(S) : Heath A. Lynn and Nathaniel M. McCully Page 1 of 1

It is certified that error appears in the above-identified patent and that said Letters Patent is hereby corrected as shown below:

Column 13, line 64, after "state", insert --when--;
Column 14, line 28, delete "activating".

Signed and Sealed this
Fifth Day of February, 2013

Teresa Stanek Rea
*Acting Director of the United States Patent and Trademark Office*